US 7,352,759 B2

(12) United States Patent
Lim et al.

(10) Patent No.: US 7,352,759 B2
(45) Date of Patent: Apr. 1, 2008

(54) DYNAMIC BANDWIDTH ALLOCATION METHOD EMPLOYING TREE ALGORITHM AND ETHERNET PASSIVE OPTICAL NETWORK USING THE SAME

(75) Inventors: Se-Youn Lim, Seoul (KR); Jae-Yeon Song, Songnam-shi (KR); Jin-Hee Kim, Suwon-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 879 days.

(21) Appl. No.: 10/657,368

(22) Filed: Sep. 8, 2003

(65) Prior Publication Data

US 2004/0057462 A1 Mar. 25, 2004

(30) Foreign Application Priority Data

Sep. 9, 2002 (KR) ........................ 10-2002-0054123

(51) Int. Cl.
H04L 12/28 (2006.01)
(52) U.S. Cl. .................................. 370/408; 370/395.41
(58) Field of Classification Search ................ 370/256, 370/285, 386, 387, 388, 400, 395.41, 395.42, 370/395.5, 401–402, 408, 419, 254, 359, 370/395.21, 411
See application file for complete search history.

(56) References Cited

U.S. PATENT DOCUMENTS 7,020,162 B2 * 3/2006 Iwasaki et al. ............. 370/468
2002/0051455 A1 * 5/2002 Lee et al. ................ 370/395.21
2003/0039211 A1 * 2/2003 Hvostov et al. ............ 370/230

FOREIGN PATENT DOCUMENTS

JP 05-063722 3/1993
JP 10-336188 12/1998

* cited by examiner

*Primary Examiner*—Brenda Pham
(74) *Attorney, Agent, or Firm*—Cha & Reiter, LLC

(57) ABSTRACT

In a DBA (Dynamic Bandwidth Allocation) method for an E-PON including an OLT and ONUs, DBACNs (DBA Control Nodes) corresponding to processes in a tree algorithm are arranged in multi-level stages with the ONUs being in the lowermost stage. DBACNs or ONUs in a specific stage are connected to a DBACN from its immediately higher stage in a tree structure. A process of allowing a DBACN to collect bandwidth request information from DBACNs or ONUs in its immediately lower stage is performed sequentially from the lowermost DBACNs to the uppermost DBACN. The uppermost DBACN allocates the smaller one of a total available allocation-bandwidth and a total requested bandwidth to DBACNs in its immediately lower stage in their priority order. DBACNs, other than the uppermost DBACN, each allocate a bandwidth allocated down from a DBACN in the immediately higher stage to DBACNs or ONUs in the immediately lower stage in their priority order.

11 Claims, 4 Drawing Sheets

DYNAMIC BANDWIDTH ALLOCATION METHOD EMPLOYING TREE ALGORITHM AND ETHERNET PASSIVE OPTICAL NETWORK USING THE SAME

CLAIM OF PRIORITY

This application claims priority to an application entitled "DYNAMIC BANDWIDTH ALLOCATION METHOD EMPLOYING TREE ALGORITHM AND ETHERNET PASSIVE OPTICAL NETWORK USING THE SAME," filed in the Korean Intellectual Property Office on Sep. 9, 2002 and assigned Serial No. 2002-54123, the contents of which are hereby incorporated by reference.

BACKGROUND OF THE INVENTION

1. Field of the Invention

The present invention relates to an E-PON (Ethernet Optical Passive Network) including a single OLT (Optical Line Terminal) and a number of ONUs (Optical Network Units), and more particularly to a bandwidth-request transmission method for data transmission of ONUs in the E-PON structure, and DBA (Dynamic Bandwidth Allocation) technology using the method.

2. Description of the Related Art

Although MAC (Medium Access Control) technologies for ATM-PON (Asynchronous Transfer Mode—Passive Optical Network) and Ethernet have already been standardized as described in IEEE 802.3z and ITU-T G983.1, functions required in the PON structure have not been defined for the Ethernet. Among PON types, the ATM-PON has been initially developed and standardized, where upstream and downstream transmission is performed with a frame including ATM cells combined into a predetermined size, and an OLT suitably inserts downstream cells to be distributed to ONUs into this frame in a tree-based PON structure. A TDM (Time Division Multiplexing) scheme is employed to gain access to data of the ONUs in upstream transmission, while a so-called "ranging" method is used as a solution to avoid data collision in an ODN (Optical Distribution Network), a passive element. To this end, upstream and downstream frames each have a field in a general ATM cell or a dedicated ATM cell to allow exchange of messages at desired intervals.

Although ATM technology employs relatively-high priced equipment, has restrictions on bandwidth, and further requires IP-packet segmentation, subscribers demand increasingly large amounts of bandwidth with the development of Internet technologies. It has therefore become a major aim to implement end-to-end transmission through a Ethernet network which employs relatively-low priced equipment and can guarantee high bandwidth. A need exists for an Ethernet scheme rather than an ATM scheme for a subscriber network, even if the network is a PON.

In the ATM-PON, upstream and downstream frames are each composed of ATM cells of a desired size, and a TDM method is employed in upstream transmission for the tree structured point-to-multipoint connection. In the case of the Ethernet, a point-to-point or collision-based MAC protocol has already been standardized with an MAC control chip thereof commercially being available. However, although the IEEE8023.ah EFM (Ethernet in the First Mile) study group has proposed a PON structure for the Ethernet that incorporates a new point-to-multipoint structure not handled in a conventional Ethernet scheme, standardization of the overall scheduling procedure including an MAC control is currently under development and has not yet been established. Further, the current E-PON has no embodied functions as required in the PON structure.

DBA scheduling of data transmission for ONUs in the ATM-PON is performed based on their service classes to guarantee QoS (Quality of Service). For this purpose, the ONUs each have for incoming traffic data four independent queues according to their service classes defined based on parameters such as VBR (Variable Bit Rate), CBR (Constant Bit Rate), and real-time property. However, in contrast to ATM, E-PON has no defined service class because it is based on an Ethernet protocol.

E-PON bandwidth allocation also differs from that of the ATM, because the Ethernet technology underlying E-PON uses variable packet size rather than ATM cells of fixed packet size.

Because they correspond to broadcast signals of the conventional Ethernet, E-PON handles the downstream traffic signals traveling from an OLT to ONUs in the same manner. However, data collision is a problem in the upstream side, due to the point-to-multipoint PON structure. To avoid data collision caused by the inevitable multiplexing of the upstream traffic signals to transfer them to the single OLT, the OLT of a E-PON is burdened with performing time distribution for each of the ONUs so that the ONUs transmit data at different times.

FIG. 1 shows the configuration of a conventional E-PON. The E-PON includes a single OLT 110, a number of ONUs 130A, 130B and 130C, and an ODN (Optical Distribution Network) 120.

The OLT 110 is positioned at the root of a tree structure, and plays a primary role in providing information to each subscriber in an access network.

Having a tree topology structure, the ODN 120 distributes downstream data frames incoming from the OLT 110 to the ONUs 130A to 130C, and multiplexes upstream data frames for transmission to the OLT 110.

A number of the ONUs 130A to 130C receive the downstream data frames and provide them to end users 140*a*, 140*b*, 140*c*, and transmit data inputted from the end users 140*a* to 140*c* as upstream data frames to the ODN 120. The end users 140*a* to 140*c* include various kinds of terminal devices, such as an NT (Network Terminal), usable in the E-PON.

FIG. 2 illustrates a dynamic bandwidth allocation procedure of the OLT 110 shown in FIG. 1. As a signal for coinciding cycle periods between the OLT 110 and the ONUs 130A to 130C, a synchronizing signal "Sync" is periodically transmitted downstream from the OLT 110. The OLT 110 transmits grant frames respectively to a number of the registered ONUs 130A to 130C to give them a chance to request bandwidth allocation. When given the bandwidth allocation request chance, the ONUs 130A to 130C each transmit upstream a bandwidth allocation request frame that includes the size of a buffer in which data currently awaiting transmission is stored, at a time of starting a bandwidth allocation request in the next period. Given a chance to perform a bandwidth-allocation-requested upstream transmission, each of the ONUs 130A to 130C subsequently transmit the data awaiting transmission during its transmission time period. Thus, in comparison to the ATM-PON employing cells of a specific form, the E-PON inevitably has more technical constraints to constituting upstream and downstream frames or to securing QoS in TDM-based upstream transmission.

SUMMARY OF THE INVENTION

The present invention has been made in view of the above problems, and provides a dynamic bandwidth allocation method employing a tree algorithm and an E-PON (Ethernet Passive Optical Network) using the same, whereby it is possible to effectively transmit Ethernet traffic signals and guarantee both efficient resource utilization and fair resource distribution among ONUs in a PON structure.

In accordance with one aspect of the present invention, an E-PON (Ethernet Passive Optical Network) includes an OLT (Optical Line Terminal) having means for assigning bandwidth to the plural ONUs. The means utilize one or more logical DBACNs (Dynamic Bandwidth Allocation Control Nodes) for collecting bandwidth request information from the ONUs and, in a priority order of the ONUs, allocating a smaller one of a total requested bandwidth and a total available allocation-bandwidth to the ONUs.

In accordance with another aspect of the present invention, there is provided a DBA (Dynamic Bandwidth Allocation) method employing a tree algorithm in an E-PON including an OLT and a plurality of ONUs connected to the OLT, the DBA method being based on arranging logical DBA Control Nodes (DBACNs) in hierarchical stages of a tree. The ONUs are positioned in a lowermost stage of the tree. DBACNs or ONUs positioned in an intermediate stage are connected to a DBACN positioned in a stage higher than that intermediate stage. DBACNs are sequentially caused to collect bandwidth request information inputted from DBACNs or ONUs connected to which they are connected from a lower stage. This sequential process starts from a lowermost DBACN and proceeds up to an uppermost DBACN in the hierarchy. The uppermost DBACN allocates a smaller one of a total available allocation-bandwidth and a total requested bandwidth to DBACNs connected to the uppermost DBA from a lower stage in a priority order of the lower stage DBACNs. DBACNs positioned in stages below that of the uppermost DBACN allocate a bandwidth that has, in turn, been allocated by a DBACN connected thereto from a higher stage to DBACNs or ONUs connected thereto from a lower stage. The allocating to the lower stage is performed in a priority order of the DBACNs or ONUs connected thereto from the lower stage.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings, with detailed description of known functions and configurations incorporated herein being omitted for clarity of presentation.

The present invention proposes an algorithm to allow an OLT to dynamically allocate bandwidth to N ONUs using bandwidth request information (or queue information) received from the ONUs. The OLT must allocate bandwidths effectively and impartially to the ONUs using the queue information transmitted from the ONUs. The dynamic bandwidth allocation is effectively achieved through a tree-structure for the connection mechanism between the OLT and ONUs for information transfer. The present invention defines logical dynamic-bandwidth-allocation control nodes (DBACNs) to constitute such a tree structure, and proposes an internal algorithm based on that structure.

Figure 1:
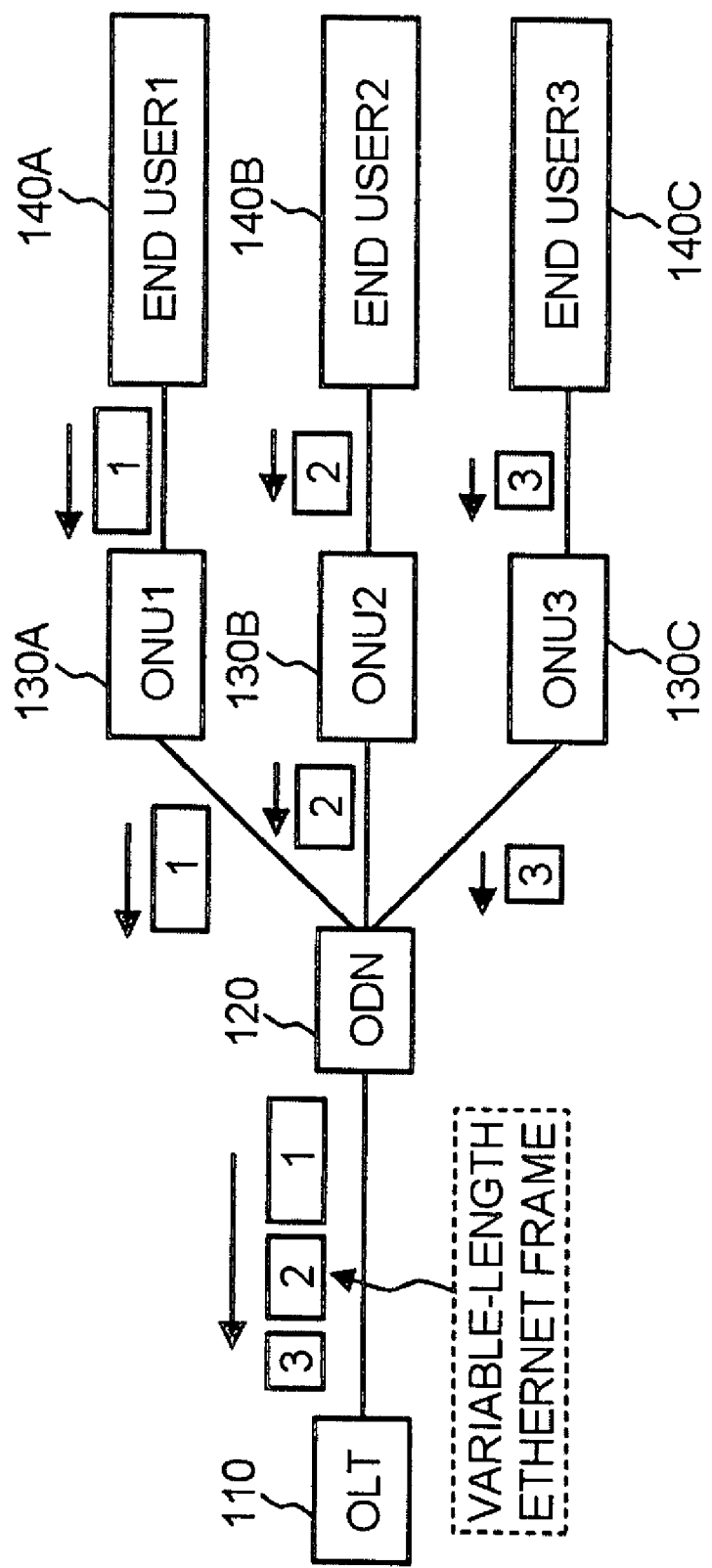
FIG. 1 is a block diagram showing the configuration of a conventional E-PON.
Figure 2:
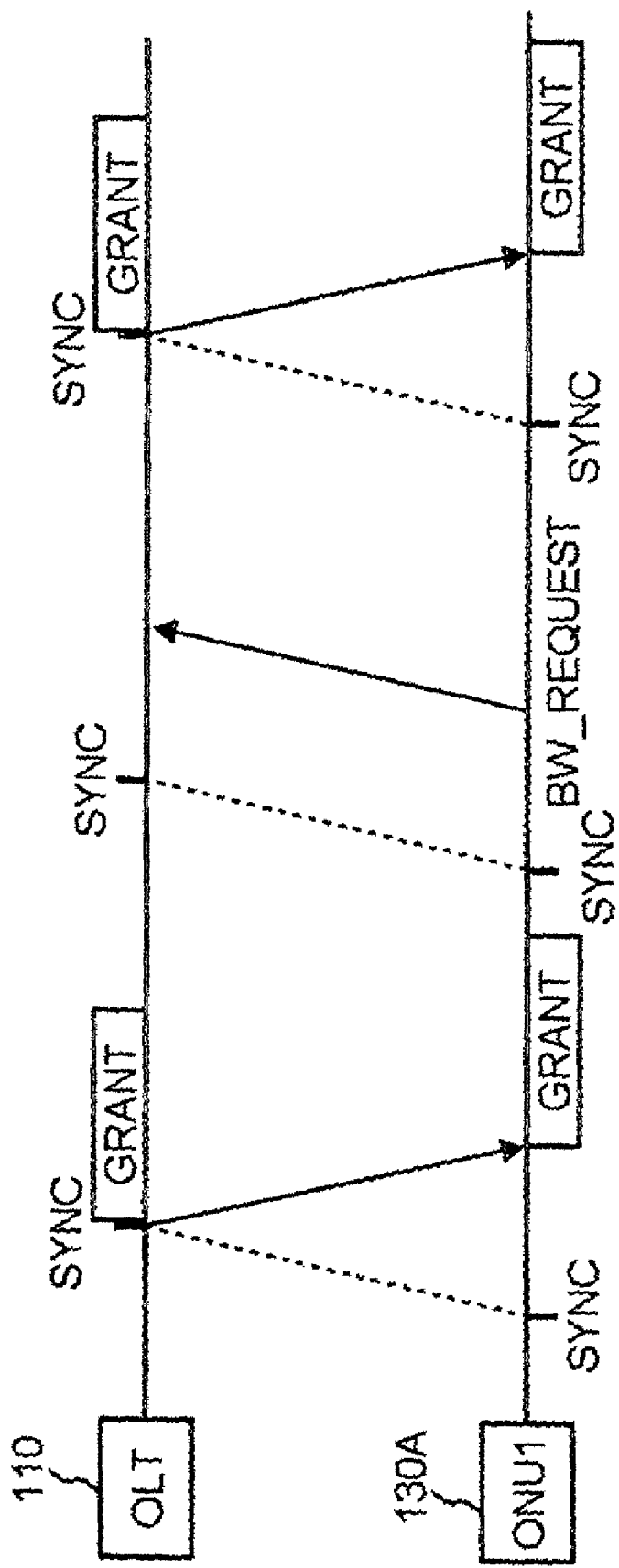
FIG. 2 is a flow diagram illustrating a dynamic bandwidth allocation procedure of an OLT 110 shown in FIG. 1.
Figure 3:
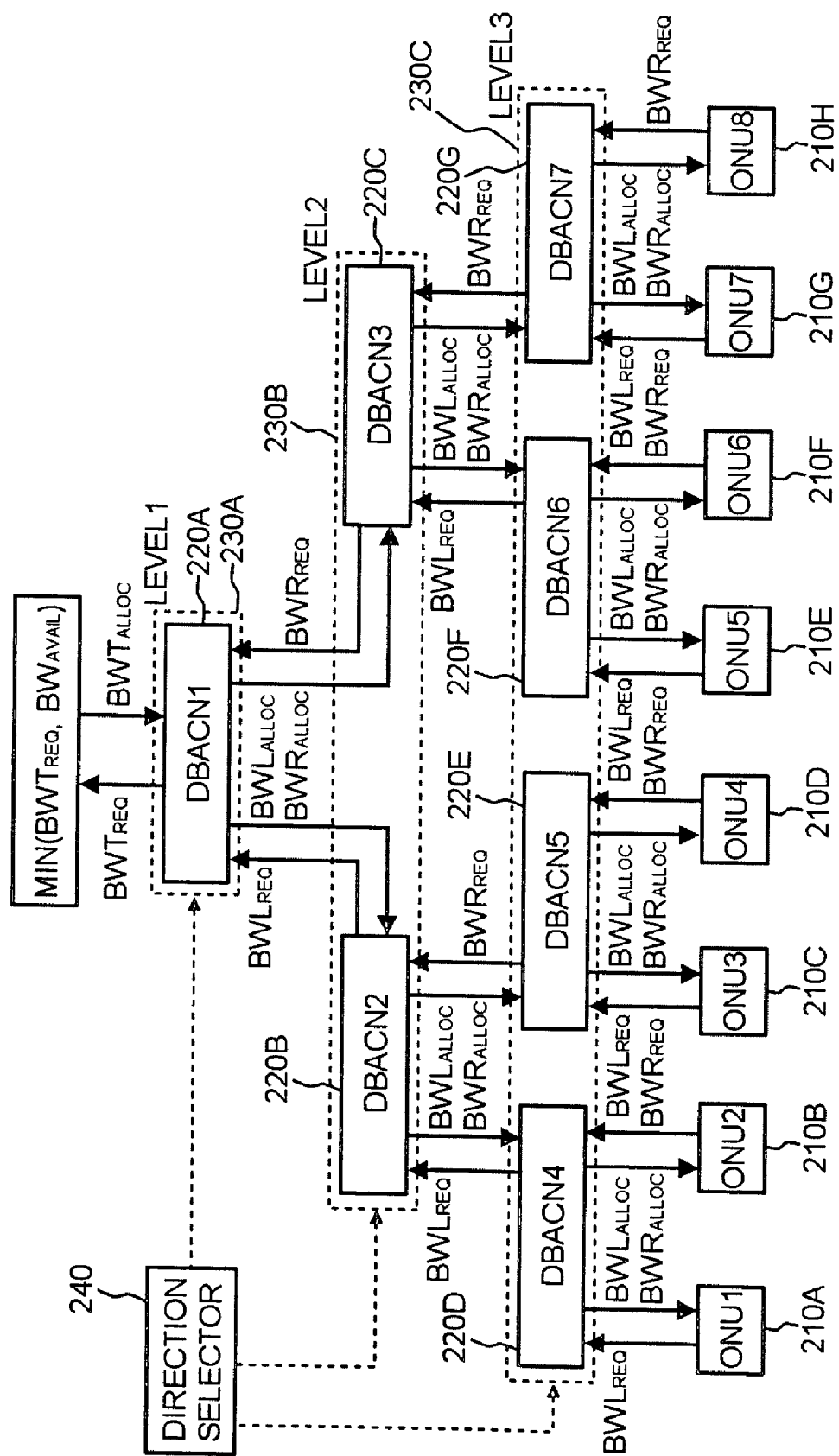
FIG. 3 is a flow diagram illustrating a dynamic bandwidth allocation method that employs a TRGA (Tree Request Grant Algorithm) according to a preferred embodiment of the present invention.
Figure 4:
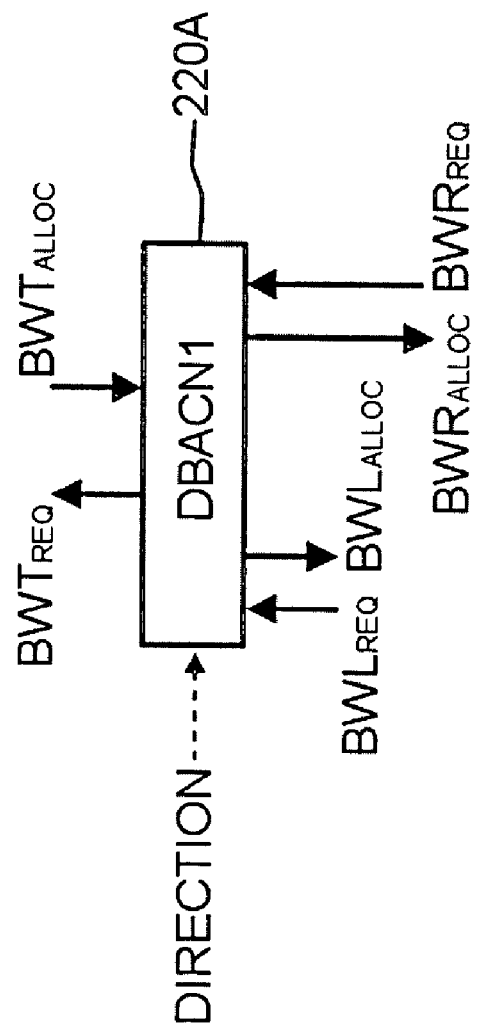
FIG. 4 is an input/output diagram describing a logical DBACN (Dynamic Bandwidth Allocation Control Node) shown in FIG. 3.

FIG. 3 illustrates a structural model representing an example of a DBA (Dynamic Bandwidth Allocation) method that employs a TRGA (Tree Request Grant Algorithm) according to a preferred embodiment of the present invention. The DBA method includes a tree formation process, a request collection process, and a bandwidth allocation process, the tree formation process corresponding to an initialization process for implementing the TRGA.

I. Tree Formation Process (Initialization Process)

The tree structure shown in FIG. 3 assumes that the number of ONUs 210A, 210B, . . . 210H is 8. The tree structure is formed to include a plurality of hierarchical stages 230A, 230B, 230C, and each stage includes one or more logical DBACNs (Dynamic Bandwidth Allocation Control Nodes) 220A, 220B, . . . 220G. The logical DBACNs 220A to 220G are not nodes on a real network; instead, each corresponds to a specific step in performing the TRGA (Tree Request Grant Algorithm) that may be executed by a computer program resident in the OLT, and which may have adjustable parameters that are updated by a scheduler of the OLT. Specifically, the algorithm starts its operation from the second-level stage 230B at which the OLT receives bandwidth request information from the ONUs 210A, 210B, . . . 210H. The algorithm is not confined to software implementation, but may be implemented for example in firmware, hardware or some combination thereof. The number of ONUs, here shown as 8, may vary as appropriate. Likewise, the number of DBACNs and hierarchical tree levels may be set to any suitable value.

For the embodiment shown in FIG. 3, each of the tree-structured DBACNs 220A to 220G determines information to be transmitted to its upper-level DBACNs and its lower-level DBACNs or the ONUs 210A to 210H. With respect to each of the DBACNs 220A to 220G, its immediately higher-level DBACN can be classified as a root node, and its immediately lower-level DBACNs or the ONUs 210A to 210H can be classified as branch nodes. Thus, each of the DBACNs 220A to 220G is a root node for its lower-level DBACNs, and is a branch node for its upper-level DBACN. Input and output values with respect to each of the DBACNs 220A to 220G are classified into upward I/O values (toward its immediately higher-level DBACN in the tree structure) and downward I/O values (toward its immediately lower-level DBACNs or ONUs). Specifically, the upward I/O values with respect to a recipient node in the tree structure include two upward input-values BWLREQ (REQuested-BandWidth from Left branch node) and BWRREQ (REQuested-BandWidth from Right branch node) that represent bandwidth request information inputted respectively from its left and right branch nodes, and include an upward output-value BWTREQ (Total REQuested-BandWidth), that the recipient node outputs to its root node, that represents the sum of the two input values BWLREQ and BWRREQ. On the other hand, the downward I/O values with respect to the recipient node include a downward input-value BWTAL-LOC (Total BandWidth to be ALLOCated) representing bandwidth allocation information inputted from its root node, and include two downward output-values BWLAL-LOC (BandWidth to be ALLOCated to Left branch node) and BWRALLOC (BandWidth to be ALLOCated to Right branch node), respectively, for distributing the downward input-value BWTALLOC to its left and right branch nodes in the immediately lower-level stage.

In the above embodiment, a binary tree is depicted wherein each DBACN is connected from below to a respectively pre-selected two elements of the group consisting of DBACNS and ONUs in the tree. It is, however, within the intended scope of the invention that a DBACN may connected from below so as to select from any respectively pre-selected number of DBACNS or ONUs in the immediately lower stage.

II. Request Collection Process

Two values BWLREQ and BWRREQ represent bandwidth request information from left and right branch nodes, respectively. Information of the sum of the two values is transmitted to their root node. This process can be expressed in C-pseudo code fragment as follows:

BWTREQ=BWLREQ+BWRREQ; //upward I/O values

This process is repeated until bandwidth request information from the ONUs 210A to 210H is delivered to the uppermost DBACN 220A that constitutes the first-level stage 230A.

III. Bandwidth Allocation Process

The uppermost DBACN 220A compares a value BWTREQ representing the total requested-bandwidth from its lower-level DBACNs 220B to 220G with a value BWAVAIL representing the total available allocation-bandwidth, and selects the lower one of the two values. This process can be expressed in C-pseudo code fragment as follows:

BWTALLOC=MIN (BWTREQ, BWAVAIL); // select the lower one of BWTREQ and BWAVAIL.

Thereafter, a process of distributing an allocation bandwidth received or selected from a root node to its branch nodes is sequentially performed, starting from the uppermost DBACN 220A. In other words, DBACNs 220B to 220G, other than the uppermost DBACN 220A, performs a process to allocate the allocation bandwidth received from the root node to its branch nodes, and this process is repeated until the bandwidth is allocated to the ONUs 210A to 210H constituting the lowermost stage 230C. Here, a direction selector 240 functions to set the value of a parameter "DIRECTION", and, according to this value, a bandwidth corresponding to the value BWTALLOC is allocated to only one of the two branch nodes (hereinafter also referred to as "two directions") corresponding respectively to the two values BWLALLOC and BWRALLOC. If the value BWTALLOC has a remaining value after it is allocated to one of the "two directions", a bandwidth corresponding to the remaining value is allocated to the other. The direction selector 240 switches to alternately select the two directions, using clocks of different periods, i.e. different time rates of switching, for the stages 230A to 230C, so as to provide the two directions with an equivalent or balanced chance to deal with their bandwidth allocation request. This process can be expressed in C-pseudo code fragment as follows:

```
IF (DIRECTION = = LEFT) {// if previous direction is left
    DIRECTION = = RIGHT; // current direction is set to right
} ELSE IF (DIRECTION = = RIGHT) {// if previous direction is right
    DIRECTION = = LEFT; // current direction is set to left
}
IF (DIRECTION = = LEFT) {// if current direction is left
    IF (BWTALLOC < BWLALLOC) {// if allocation bandwidth is less than requested bandwidth
        BWLALLOC = BWTALLOC;
        BWRALLOC = 0; // BWTALLOC is all allocated to left branch node
    } ELSE {// if allocation bandwidth is equal to or more than requested bandwidth
        BWLALLOC = BWLALLOC; // bandwidth equal to requested bandwidth is allocated to left branch node
        BWRALLOC = BWTALLOC − BWLALLOC; // remaining bandwidth is allocated to right branch node
    }
} ELSE IF (DIRECTION = = RIGHT) {// if current direction is right
    if (BWTALLOC < BWRALLOC) {// if allocation bandwidth is less than requested bandwidth
        BWRALLOC = BWTALLOC;
        BWLALLOC = 0; // BWTALLOC is all allocated to right branch node
    } ELSE {// if allocation bandwidth is equal to or more than requested bandwidth
        BWRALLOC = BWRALLOC, // bandwidth equal to requested bandwidth is allocated to right branch node
        BWLALLOC = BWTALLOC − BWRALLOC // remaining bandwidth is allocated to left branch node
    }
}
```

For implementations with more than two branches from a node, the directional selector 240 switches, in a manner analogous to the above implementation, alternately among the more than two branches, and may distribute remaining bandwidth first to one neighboring branch and then, if bandwidth still remains, to another and so forth.

As apparent from the above description, a DBA (Dynamic Bandwidth Allocation) method employing a tree algorithm according to the present invention has the following advantages. Firstly, a simple tree structure is employed so as to allow a complicated DBA algorithm to have a high operating speed.

Secondly, since a bandwidth allocation chance is provided to ONUs in a switching fashion, it is possible to give them a balanced chance to deal with a requested bandwidth allocation. The bandwidth allocation to only one of the two directions aims to achieve an effective allocation of insufficient resources and maintain the traffic's characteristics, while the switching operation for selecting the direction tends to eliminate bandwidth allocation inequality between the different directions, thereby achieving balanced distribution of chances to deal with the bandwidth allocation request. In particular, in the case of a traffic that has a bursty characteristic and thus has a large variation in the input ratio of packets to be accumulated in a queue, it is difficult to maintain the bursty characteristic because limited resources cause the amount of allocated bandwidth to be smaller than that of requested bandwidth. In such a case, the alternate provision of chance to deal with the bandwidth allocation request, according to the present invention, allows the use of a relatively large amount of resources, which makes it easy to maintain the traffic's characteristics.

By the same token, although bandwidth allocation chances come alternately, once in two periods, from the viewpoint of ONUs, causing a packet accumulated in a queue to await transmission during at least one period, such transmission delay is not problematic. A conventional bandwidth allocation method employing a general DBA algorithm most often fails to allocate all the requested bandwidth on the first request, and thus another chance to request all or part of the requested bandwidth comes only after waiting more than one period.

Thirdly, a DBACN allows bandwidth that remains after performing bandwidth allocation to one direction (i.e., one of the two branch nodes or ONUs) to be allocated to the other, thereby improving overall throughput.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An E-PON (Ethernet Passive Optical Network) comprising:
   an OLT (Optical Line Terminal); and
   a plurality of ONUs (Optical Network Units) connected to the OLT,
   said OLT including means for assigning bandwidth to the plural ONUs utilizing one or more logical DBACNs (Dynamic Bandwidth Allocation Control Nodes),
   wherein the DBACNs and ONUs are arranged in hierarchical stages of a tree, with the ONUs being positioned in a lowermost stage thereof, and DBACNs or ONUs positioned in an intermediate stage are connected to a DBACN positioned in a stage higher than that intermediate stage, each of the DBACN allocates a smaller of a total available allocation-bandwidth and a total requested bandwidth to a lower stage DBACNs or ONUs connected thereto in a priority order of said tree.

2. The E-PON of claim 1, wherein said allocating comprises the intermediate step of allocating at least part of said smaller of a total requested bandwidth and a total available allocation-bandwidth to at least one of said lower stage DBACNs.

3. The E-PON of claim 1, wherein, in performing said allocating, at least some of the DBACNs select from among at least two elements respectively pre-selected from the group that includes the plural ONUs and one or more DBACNS.

4. The E-PON of claim 3, wherein the selecting entails switching periodically among the pre-selected elements, and wherein a time rate of the switching varies with a hierarchical stage in said tree of the selecting DBACN.

5. The E-PON of claim 1, wherein the assigning means includes a processor and a computer-readable medium for storing a computer program which, when executed by the processor, executes said collecting and said allocating.

6. The E-PON as set forth in claim 1, wherein said one or more DBACNs each sequentially select one of the plural ONUs at a time, and allocates a bandwidth to the selected one.

7. The E-PON as set forth in claim 1,
   wherein the DBACNs positioned in stages other than the uppermost stage each collect bandwidth request information inputted from DBACNs or ONUs connected thereto from a lower stage, and output the collected information to a DBACN connected thereto at a higher stage.

8. The E-PON as set forth in claim 1, wherein the DBACNS arc each connected, from an immediately higher stage, to two of the one or more DBACNS and plural ONUs.

9. A DBA (Dynamic Bandwidth Allocation) method employing a tree algorithm in an E-PON including an OLT and a plurality of ONUs connected to the OLT, the DBA method being based on steps comprising:
   a) arranging a plurality of logical DBA Control Nodes (DBACNs) in hierarchical stages of a tree with the ONUs being positioned in a lowermost stage thereof, and connecting DBACNs or ONUs positioned in an intermediate stage to a DBACN positioned in a stage higher than that intermediate stage;
   b) sequentially performing a process of causing a DBACN to collect bandwidth request information inputted from DBACNS or ONUs connected thereto from a lower stage, starting from a lowermost DBACN up to an uppermost DBACN in the hierarchy;
   c) causing the uppermost DBACN to allocate a smaller one of a total available allocation-bandwidth and a total requested bandwidth to DBACNs connected thereto from a lower stage in a priority order of said DBACNS connected thereto from a lower stage; and
   d) causing DBACNs positioned in stages below that of the uppermost DBACN to each allocate a bandwidth allocated by a DBACN connected thereto from a higher stage to DBACNs or ONUs connected thereto from a lower stage in a priority order of said DBACNS or ONUs connected thereto from a lower stage.

10. The DBA method as set forth in claim 9, wherein, during the steps c) and d), the DBACNS each select one of DBACNs or ONUs connected thereto from a lower stage at a time, and preferentially allocate bandwidth to the selected one.

11. The DBA method as set forth in claim 9, wherein, at step a), the DBACNS are each connected, from an immediately higher stage, to two of the plural DBACNs and ONUs.

* * * * *